(12) United States Patent
Apelfrodj et al.

(10) Patent No.: US 11,159,349 B2
(45) Date of Patent: Oct. 26, 2021

(54) METHOD FOR ESTIMATING THE CHANNEL BETWEEN A TRANSCEIVER AND A MOBILE COMMUNICATING OBJECT

(71) Applicant: ORANGE, Issy-les-Moulineaux (FR)

(72) Inventors: Rikke Apelfrodj, Chatillon (FR); Mikael Sternad, Chatillon (FR)

(73) Assignee: ORANGE, Issy-les-Moulineaux (FR)

( * ) Notice: Subject to any disclaimer, the term of this patent is extended or adjusted under 35 U.S.C. 154(b) by 0 days.

(21) Appl. No.: 16/958,300

(22) PCT Filed: Dec. 19, 2018

(86) PCT No.: PCT/FR2018/053403
§ 371 (c)(1),
(2) Date: Jun. 26, 2020

(87) PCT Pub. No.: WO2019/129955
PCT Pub. Date: Jul. 4, 2019

(65) Prior Publication Data
US 2021/0058275 A1    Feb. 25, 2021

(30) Foreign Application Priority Data

Dec. 27, 2017    (FR) ...................................... 1763263

(51) Int. Cl.
*H04L 25/02* (2006.01)
*H04L 5/14* (2006.01)

(52) U.S. Cl.
CPC ........ *H04L 25/0232* (2013.01); *H04L 5/1469* (2013.01); *H04L 25/024* (2013.01); *H04L 25/0204* (2013.01); *H04L 25/0256* (2013.01)

(58) Field of Classification Search
CPC ... H04L 5/0082; H04L 5/0085; H04L 5/1469; H04L 25/0202; H04L 25/0204;
(Continued)

(56) References Cited

U.S. PATENT DOCUMENTS

| 6,268,824 B1* | 7/2001 | Zhodzishky | ............ G01S 19/37 |
| | | | 342/357.31 |
| 2003/0115232 A1* | 6/2003 | Lipp | .................... H03H 21/003 |
| | | | 708/300 |

(Continued)

OTHER PUBLICATIONS

Sternad et al., "Using "Predictor Antennas" for Long-Range Prediction of Fast Fading for Moving Relays", IEEE Wireless Communications and Networking Conference, Paris, Apr. 2012.

(Continued)

*Primary Examiner* — Young T. Tse
(74) *Attorney, Agent, or Firm* — David D. Brush; Westman, Champlin & Koehler, P.A.

(57) ABSTRACT

A channel estimation method. For at least one temporal difference observed between two sub-sequences of channel measurements, or channel estimations, consisting of complex vectors or scalars, the method includes: a first extrapolation on the basis of channel measurements or channel estimations of the sub-sequence preceding the temporal difference, going forward in time; a second extrapolation on the basis of channel measurements or channel estimations of the sub-sequence following the temporal difference, going backward in time; and calculation of a weighted average of the extrapolated estimations or measurements forward in time and of the extrapolated estimations or measurements backward in time, in order to obtain channel measurements or channel estimations regularly spaced apart in the temporal difference. The method is suitable for radio communications between a base station and a moving connected vehicle.

10 Claims, 4 Drawing Sheets

(58) Field of Classification Search
CPC . H04L 25/0232; H04L 25/024; H04L 25/025;
H04L 25/0256; H04L 2025/03611; H04L
2025/03636; H04L 2025/03656
USPC ........ 375/260, 262, 265, 267, 346, 349, 350
See application file for complete search history.

(56) References Cited

U.S. PATENT DOCUMENTS

| | | | |
|---|---|---|---|
| 2007/0064840 A1 | 3/2007 | Kang et al. | |
| 2010/0226448 A1* | 9/2010 | Dent ................ | H04L 27/2647 375/260 |
| 2014/0254421 A1* | 9/2014 | Ahlander ............ | H04L 25/0224 370/252 |

OTHER PUBLICATIONS

Sui et al., "The Potential of Moving Relays—A Performance Analysis", IEEE Vehicular Technology Conference, Yokohama, May 2012.

Phan-Huy et al., "Adaptive Large MISO Downlink with Predictor Antenna Array for very fast moving vehicles", 2013 International Conference on Connected Vehicles and Expo (ICCVE), DOI 10.1109/ICCVE.2013.70.

Bjorsell Joachim et al: "Predictor antennas in action", 2017 IEEE 28th Annual International Symposium on Personal, Indoor, and Mobile Radio Communications (PIMRC), IEEE, Oct. 8, 2017 (Oct. 8, 2017), pp. 1-7, XP033321130.

N. Shimkin: "7 Optimal Smoothing", Prof. N. Shimkin, Jan. 1, 2009 (Jan. 1, 2009), XP055502304, Retrieved from the Internet: URL:http://webee.technion.ac.il/people/shimkin/Estimation09/ch7_smoothing.pdf [retrieved on Aug. 27, 2018] section 7.3; p. 7.

Kashyap Salil et al.: "Performance analysis of (TDD) massive MIMO with Kalman channel prediction", 2017 IEEE International Conference on Acoustics, Speech and Signal Processing (ICASSP), IEEE, Mar. 5, 2017 (Mar. 5, 2017), pp. 3554-3558, XP033259073.

English translation of the Written Opinion of the International Searching Authority dated Feb. 26, 2019 for corresponding International Application No. PCT/FR2018/053403, filed Dec. 19, 2018.

International Search Report dated Feb. 26, 2019 for corresponding International Application No. PCT/FR2018/053403, filed Dec. 19, 2018.

* cited by examiner

METHOD FOR ESTIMATING THE CHANNEL BETWEEN A TRANSCEIVER AND A MOBILE COMMUNICATING OBJECT

CROSS-REFERENCE TO RELATED APPLICATIONS

This Application is a Section 371 National Stage Application of International Application No. PCT/FR2018/053403, filed Dec. 19, 2020, the content of which is incorporated herein by reference in its entirety, and published as WO 2019/129955 on Jul. 4, 2019, not in English.

FIELD OF THE DISCLOSURE

The field of the invention is that of telecommunications between communicating entities in relative movement.

More specifically, the present invention relates to radio communications between a transceiver, such as a base station, and a moving connected vehicle.

BACKGROUND OF THE DISCLOSURE

Generally, a radio signal transmitted by an antenna of a communicating entity, known as an antenna signal, undergoes deformations depending on the propagation conditions between a point of origin defined at the output of the originating antenna and a destination point defined at the input of an antenna of the destination communicating entity. In order to limit these deformations, the antenna signal is distorted beforehand by applying pre-equalization coefficients on the basis of the characteristics of the propagation channel between these two antennas. It is therefore necessary to characterize this propagation channel.

Estimates of a radio communication channel are generally obtained by having one of the communicating entities send known reference signals, recording the signals received by the other communicating entity and then calculating an estimate of the channel at the time and for the frequency of the reference signal. For example, in communication systems that use OFDM (acronym for the English "Orthogonal Frequency-Division Multiplexing") modulation, channel estimates are in the form of complex gains for each subcarrier of the OFDM symbol over which the reference signals have been transmitted.

Furthermore, communications with an increasing number of connected vehicles, in particular public transport vehicles, will become very costly in terms of power and bandwidth unless advanced communication methods are used. These will be based on channel estimates at the transmitter ("Channel State Information at the Transmitter", or CSIT).

A first problem associated with communications with connected vehicles relates to the power losses as the waves penetrate from the outside to the inside of the vehicle; in practice, these losses have a significant impact on the performance of the system. More specifically, measurements have shown that the penetration losses in a vehicle can be as high as 25 dB for a user equipment that receives waves at a frequency of 2.4 GHz inside a van. Even greater losses are projected for higher frequencies, for example for bands around 3.5 GHz allocated to next-generation mobile communication systems, and for certain vehicles that have a high degree of insulation against electromagnetic waves.

In order to overcome this problem, it has been proposed (see the article by Y. Sui, A. Papadogiannis and T. Svensson entitled "*The Potential of Moving Relays—A Performance Analysis*", IEEE Vehicular Technology Conference, Yokohama, May 2012) to provide the vehicle, for example a bus or a tram, with a mobile relay located on the outside of the vehicle. This mobile relay uses an external antenna (typically on the roof of the vehicle), which is connected to an antenna located inside the vehicle. The external antenna communicates with the base station (backhaul link), while the internal antenna communicates with the user devices by means of a local area communication network (for example a Wi-Fi network). The effectiveness of a communication system of this kind then depends on the performance and the reliability of the link between the relay and the base station.

A second problem associated with communications with connected vehicles is that the channel varies depending on the position of the external antenna. After an external antenna of the vehicle has transmitted a reference signal, the base station transmits the pre-equalized useful signal, accordingly, with a certain processing delay $\Delta t$ (around 5 ms in the case of LTE (Long Term Evolution) systems, for example); but, during this delay, the vehicle has moved, with the result that the channel between the base station and the external antenna is no longer the same as when the reference signal was transmitted. Nevertheless, in the prior art, the useful signal can be pre-equalized in view of a given movement of the antenna of the vehicle up to a certain maximum $\Delta x$ (typically around 0.3 carrier wavelengths) on the basis of the current channel estimate and previous channel estimates and taking into account the classic fast-fading phenomenon, i.e. the variations in the amplitude of the received signal caused by the reflections of the electromagnetic waves from objects near the receiver. Unfortunately, at the speeds that are usual in an urban area (around 50 km/h) and at the usual carrier frequencies (in the GHz range), the vehicle moves more than $\Delta x$ in $\Delta t$.

In order to overcome this second problem, a method known as the "Predictor Antenna" method (see. the article by M. Sternad, M. Grieger, R. Apelfröjd, T. Svensson, D. Aronsson and A. Belén Martinez entitled "*Using predictor antennas for long-range prediction of fast fading for moving relays*", IEEE Wireless Communications and Networking Conference, Paris, April 2012) has been proposed, which uses, on the outside of the vehicle, an additional antenna, which is known as a "Predictor Antenna" and is placed in front of the external antenna, which is known as the "main antenna" and is dedicated to exchanges of useful data ("payload") with the base station. Estimating the baseband radio channel at the current position of the Predictor Antenna makes it possible to predict which channels the main antenna (which is thus placed behind the Predictor Antenna) will be dealing with once the main antenna reaches the current position of the Predictor Antenna.

The Predictor Antenna method thus advantageously makes it possible to predict channel estimates over periods of time that are longer by an order of magnitude than those applicable on the basis of the extrapolation of channel measurements in the past. This method is therefore extremely worthwhile for application to connected vehicles that employ an advanced radio infrastructure.

For processing of the signal, like for evaluation of a statistical model of the change in the channel with respect to time and frequency, and also for channel prediction, it is highly desirable to have a series of time samples that are regularly spaced out over time. This is the case, in particular, for the Predictor Antenna method. Now, the position of the reference signals with respect to time, to the frequency and to the antenna port is determined by the communication standard used and by implementation choices. Unfortunately, in many communication systems, this position is not regular over time. This is the case, in particular, for "Time-Division Duplex" (TDD) transmissions, in which the estimation by the base station of the channels on the "uplink", by using reference signals that are also on the uplink, is interrupted by transmission intervals on the "downlink", during which the base station has no reference signal. In these communication systems, it is therefore necessary to implement an interpolation method in order to obtain, from series of channel estimates that are irregularly spaced out over time, a series of channel estimates that are situated as required in time, for example regularly spaced out over time.

Various interpolation methods suitable for this are known, for example interpolation methods that implement high-order polynomial interpolation. However, the known methods have suboptimal and unsatisfactory properties when applied to channel estimates that have estimation errors, i.e. to series of data that are "noisy", as is the case for communications between a base station and a vehicle in an urban area.

SUMMARY

Therefore, according to a first aspect, the present invention relates to a channel estimation method comprising, for at least one time gap observed between two sub-sequences of channel measurements or of channel estimates consisting of complex vectors or scalars, the following steps:
 a first extrapolation is performed on the basis of channel measurements or channel estimates of the sub-sequence that precedes said time gap, going forward in time,
 a second extrapolation is performed on the basis of channel measurements or channel estimates of the sub-sequence that follows the time gap, going backward in time, and
 a weighted mean of said measurements or estimates extrapolated forward in time and of said measurements or estimates extrapolated backward in time is calculated so as to obtain channel measurements or channel estimates that are regularly spaced out over the time gap.

Thus, with a view to carrying out a channel estimation, the present invention proposes a novel method for interpolating time series of channel measurements or channel estimates, with the aim of filling abnormally long time gaps between the transmissions of reference signals. The case in which vectors are involved relates to the application of the invention to carrier multiplets, in which case the invention makes it possible to filter the noise for a plurality of frequencies.

By virtue of these provisions, series of channel measurements and channel estimates that are noisy and irregular over time can be processed very effectively, and channel predictions can be derived therefrom over considerably longer periods of time than in the prior art.

The method according to the invention may advantageously be implemented during a communication between a network entity and a mobile communicating object comprising at least one Predictor Antenna and at least one main antenna.

According to particular features, said first extrapolation and said second extrapolation are performed, and said weighted mean is taken, by means of Kalman smoothing.

By virtue of these provisions, the final estimates obtained are optimal in terms of minimization of the mean squared error (MSE) in the estimated quantities. Indeed, the extrapolation forward in time, the extrapolation backward in time and the weighted mean are all optimal in terms of MSE, and in addition the two extrapolations are statistically independent.

Correspondingly, according to a second aspect, the invention relates to a network entity for channel estimation, comprising, for a given time gap between two sub-sequences of channel measurements or of channel estimates consisting of complex vectors or scalars, means for:
 performing a first extrapolation on the basis of channel measurements or channel estimates of the sub-sequence that precedes said time gap, going forward in time,
 performing a second extrapolation on the basis of channel measurements or channel estimates of the sub-sequence that follows the time gap, going backward in time, and
 calculating a weighted mean of said measurements or estimates extrapolated forward in time and of said measurements or estimates extrapolated backward in time so as to obtain channel measurements or channel estimates that are regularly spaced out over the time gap.

This network entity may advantageously be accommodated in a physical network node or a virtual network node (in the "cloud") that is responsible for managing downlink transmissions, for example in a base station of a cellular communication network.

According to particular features, said network entity further comprises means for performing said first extrapolation and said second extrapolation, and for taking said weighted mean, by means of Kalman smoothing.

The advantages offered by these network entities are essentially the same as those offered by the corresponding methods succinctly set forth above.

It should be noted that it is possible to embody these devices in the context of software instructions and/or in the context of electronic circuits.

According to a third aspect, the invention relates to a communication network. Said communications network is characterized in that it comprises:
 at least one network entity as has been succinctly described above, and
 at least one mobile communicating object provided with at least one Predictor Antenna and at least one main antenna.

The advantages offered by this communication network are essentially the same as those offered by the corresponding methods succinctly set forth above.

Another subject of the invention is a computer program that is downloadable from a communication network and/or is stored on a computer-readable medium and/or is executable by a microprocessor. This computer program is noteworthy in that it comprises instructions for carrying out the steps of the channel estimation method succinctly set forth above when it is executed on a computer.

The advantages offered by this computer program are essentially the same as those offered by said method.

BRIEF DESCRIPTION OF THE DRAWINGS

Other aspects and advantages of the invention will become apparent on reading the detailed description below of particular embodiments, which are given by way of non-limiting example. The description makes reference to the figures accompanying it, in which.

DETAILED DESCRIPTION OF ILLUSTRATIVE EMBODIMENTS

An embodiment of the invention in which the algorithm described in the article by J. Björsell, M. Sternad and M. Grieger entitled "*Predictor Antennas in Action*" (IEEE International Symposium on Personal, Indoor and Mobile Radio Communications, Montreal, October 2017) is used will now be described. This algorithm applies to the "Predictor Antenna" method succinctly described above, and performs interpolation and noise filtering on measurements taken on the basis of aperiodic signals (the reference signals).

Figure 1:
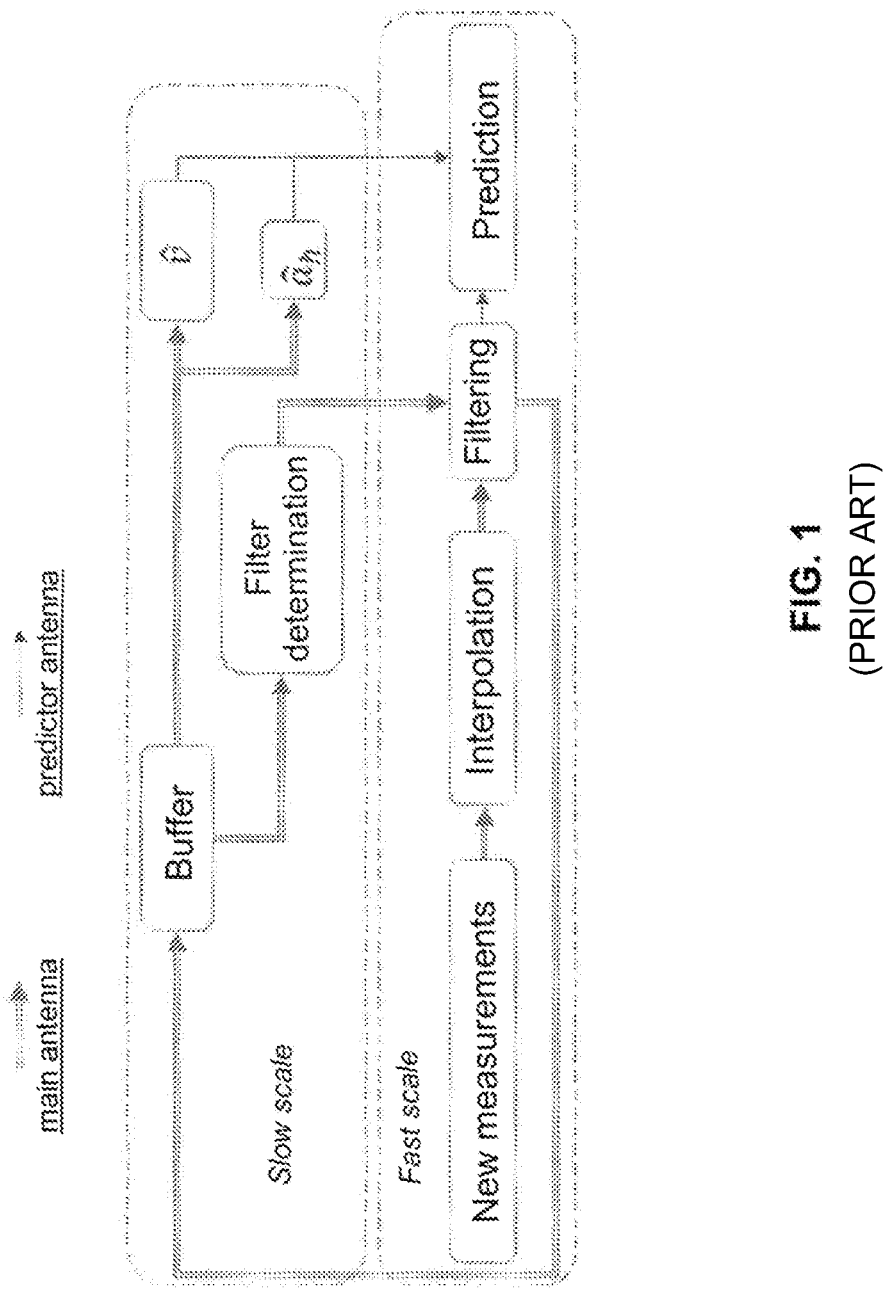
FIG. 1 schematically shows a conventional channel estimation algorithm.

The description below will make reference to FIG. 1, which has been adapted from a figure in said article.

For the sake of simplicity, it will be assumed in the present case that just one Predictor Antenna and just one main antenna (for exchanges of payload data with the base station) are used, but this algorithm can readily be applied more generally to the case of a plurality of predictor and/or main antennas.

The main steps of this algorithm will first be summarized.

The value that will be assumed by the complex scalar channel $h_m$ picked up by the main antenna in T seconds' time is predicted by multiplying the previously estimated and appropriately delayed channel $h_p$ picked up by the Predictor Antenna by a coefficient with complex values $a_h$ according to the following equation:

$$\hat{h}_m(t+\tau) = a_h \hat{h}_p(t+\tau-\Delta t), \quad (1)$$

where t is the current time, $\hat{h}_p(t+\tau-\Delta t)$ is a smoothed estimate of $h_p$ obtained from noisy measurements taken before the time t, and $\Delta t$ is the time lag between the Predictor Antenna and the main antenna passing through the same position in space.

The algorithm comprises two parts that operate in conjunction with one another: a part that operates with a slow time scale, known as the "slow scale part", and a part that operates with a fast time scale, known as the "fast scale part". The fast scale part generates a new prediction at successive time intervals known as "prediction intervals", with a short period. The slow scale part generates parameters at successive time intervals with a long period, which is a multiple of the short period.

The slow scale part estimates the coefficient $a_h$ and the velocity v of the vehicle on the basis of channel measurements, stored in a buffer, from the Predictor Antenna and the main antenna. More specifically, the coefficient $a_h$ is evaluated on the basis of the maximum correlation between the antennas, and the velocity v is evaluated on the basis of the value of the time lag between the antennas that maximizes the correlation between the antennas (the distance between the antennas being known beforehand). Furthermore, the slow scale part determines the coefficients of a low-pass "Finite Impulse Response" (FIR) filter; this FIR filter is applied in the fast scale part to suppress high-frequency estimation errors in $h_m$ and $h_p$. The values of $a_h$, v and of the coefficients of the FIR filter are used by the fast scale part during the subsequent prediction interval, after which new parameters are estimated by the slow scale part.

The fast scale part interpolates and filters the channels of all the antennas, and then predicts the channel of the main antenna. Indeed, interpolation is necessary because the time series of channel estimates is assumed to comprise sub-sequences in which at least two channel estimates are available, but with time gaps between the sub-sequences. The interpolation provides a dense sequence, which is uniform over time, of samples to which the last FIR filter obtained can be applied. The filtered estimates of the channel of the Predictor Antenna are then inserted into equation (1) in order to predict the value that will be assumed by the main channel in $\tau$ seconds' time. Finally, the filtered measurements for all the antennas are copied to the buffer in order to be used during the next iteration of the slow scale part.

It should be noted, to complete this summary, that this algorithm requires an initiation phase (not shown in FIG. 1), during which a slow scale iteration is implemented in order to generate the first estimates on the basis of unfiltered measurements retrieved from the buffer.

An interpolation method implemented in the present embodiment of the invention will now be described with reference to FIG. 2.

For a given time gap between two sub-sequences of channel estimates, an extrapolation is first performed on the basis of the channel estimates of the sub-sequence that precedes the gap, going forward in time. A second extrapolation is then performed on the basis of the channel estimates of the sub-sequence that follows the gap, going backward in time. Finally, a weighted mean of the estimates extrapolated forward in time and of the estimates extrapolated backward in time is calculated so as to obtain channel estimates that are regularly spaced out over the time gap.

Figure 2:
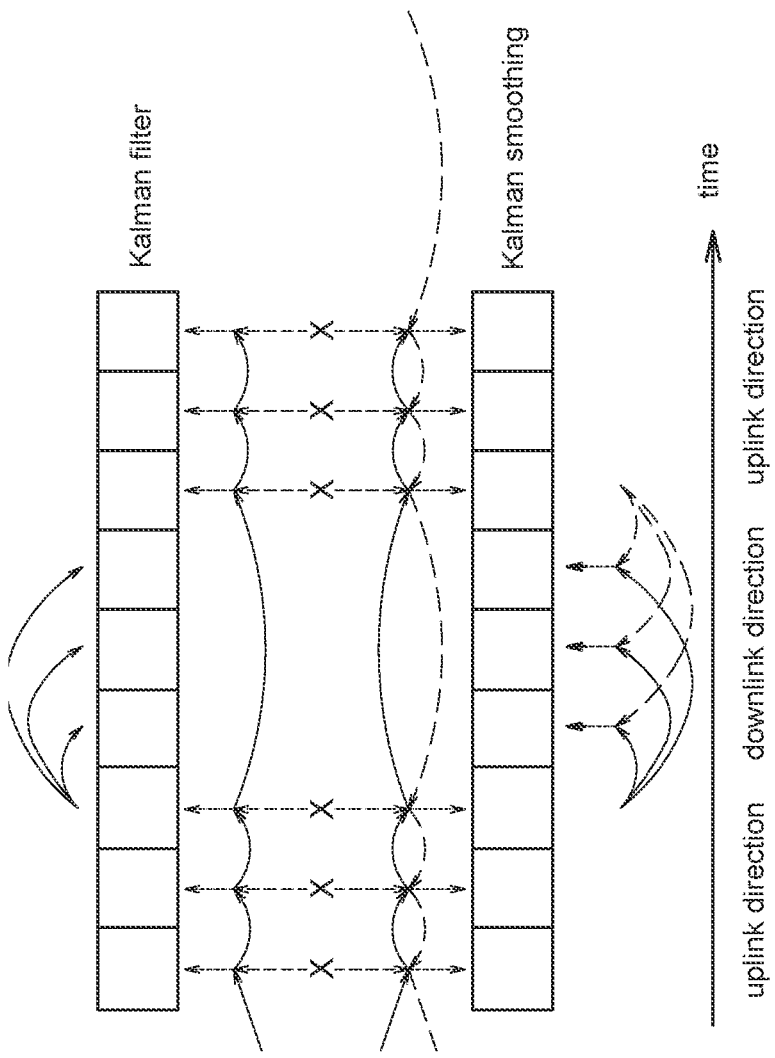
FIG. 2 schematically shows an interpolation method according to the invention.

In a TDD system regulated by time slots of equal duration, the propagation channels for the time slots on the uplink can be estimated on the basis of measurements (indicated by "x"s in FIG. 2). Using channel reciprocity, the propagation channels for the time slots on the downlink can then be extrapolated on the basis of the channel estimates of the uplink time slots.

According to a variant, said extrapolations are performed by means of a Kalman filter.

It will be recalled in relation to this (see Wikipedia) that a filter that estimates the states of a dynamic system on the basis of a series of incomplete or noisy measurements is known as a "Kalman filter". In the case of successive measurements, the Kalman filter is a recursive estimator with a timestep: this means that all that is needed in order to estimate the present state is the results of current measurements and the estimate of the previous state, which has been made at the previous timestep; in other words, the history of prior measurements and estimates is not required. The Kalman filter relies on the dynamics of the system under consideration, which define the change therein over time: better data are thus obtained by eliminating the effect of noise. These data can be calculated for the past ("smoothing"), i.e. for a past timestep, on the basis of current measurements and of estimates made during a future timestep, as long as these measurements and estimates are available. These data can also be calculated for the future ("prediction"), i.e. for a future timestep, on the basis of current measurements and of estimates made during a past timestep.

The state of the filter is represented by two variables that are updated at each iteration of the filter, i.e. at each timestep:

the estimate of the current state; and the covariance matrix of the error, which measures the accuracy of the estimated state.

The Kalman filter comprises two distinct phases: a prediction phase and an update phase. The prediction phase uses the state estimated at the previous timestep or at the next timestep to produce an estimate of the current state. In the update step, the current measurements are used to correct the predicted state with a view to obtaining a more accurate estimate.

It can be shown that when the noise is Gaussian, the Kalman filter minimizes the mean squared error in the estimated quantities; this is why the Kalman filter is said to be "optimal".

It should be noted that the use of a Kalman filter for making a prediction on channel estimates is known per se (see for example the article by S. Kashyap, C. Mollén, E. Bjornson and E. G. Larsson entitled "*Performance Analysis of (TDD) Massive MIMO with Kalman Channel Prediction*", IEEE International Conference on Acoustics, Speech, and Signal Processing, New Orleans, March 2017).

In the present variant of the invention, the extrapolation forward in time is performed by means of a Kalman filter; this is therefore an autoregressive time series model that describes the change in the channel going forward in time (it is recalled that in an autoregressive series, the current estimate of a quantity depends linearly on the previous estimates of this same quantity and on a stochastic term). The extrapolation backward in time is also performed by means of a Kalman filter; this is therefore an autoregressive time series model that describes the change in the channel going backward in time. Finally, the weighted mean of the two extrapolations is calculated by performing optimal mean squared error weighting, which takes into account the variances of the errors in the two extrapolations.

In a TDD system, the uplink and downlink time slots constitute the timesteps of the Kalman filter, whether it is used for predicting (forward in time) or for smoothing (backward in time). More specifically, for each uplink time slot, the channel is estimated as the weighted sum, which is optimal in terms of MSE, of the following two terms: the channel predicted by the Kalman filter on the basis of the estimate at the previous timestep and of the current measurement. A first estimate of the channel of the $m^{th}$ (where $m \geq 1$) downlink time slot is then calculated as the channel predicted by the Kalman filter after m timesteps on the basis of the last uplink channel estimate.

The Predictor Antenna also provides access to future estimates and measurements. With Kalman smoothing, the channel of every uplink time slot is estimated as the weighted sum, which is optimal in terms of MSE, of the following two terms: the current channel measurement, and the extrapolation of a timestep backward by the Kalman filter on the basis of the channel estimated at the subsequent timestep. Let the number of downlink time slots be denoted by N. A second estimate of the channel of the $m^{th}$ downlink time slot is then calculated as the channel extrapolated backward by the Kalman filter after (N−m) timesteps backward on the basis of the first uplink channel estimate in the future.

Finally, the final estimate of the channel for the $m^{th}$ downlink time slot is obtained by calculating the weighted sum, which is optimal in terms of MSE, of the first estimate and of the second estimate of the channel the $m^{th}$ downlink time slot.

Figure 3:
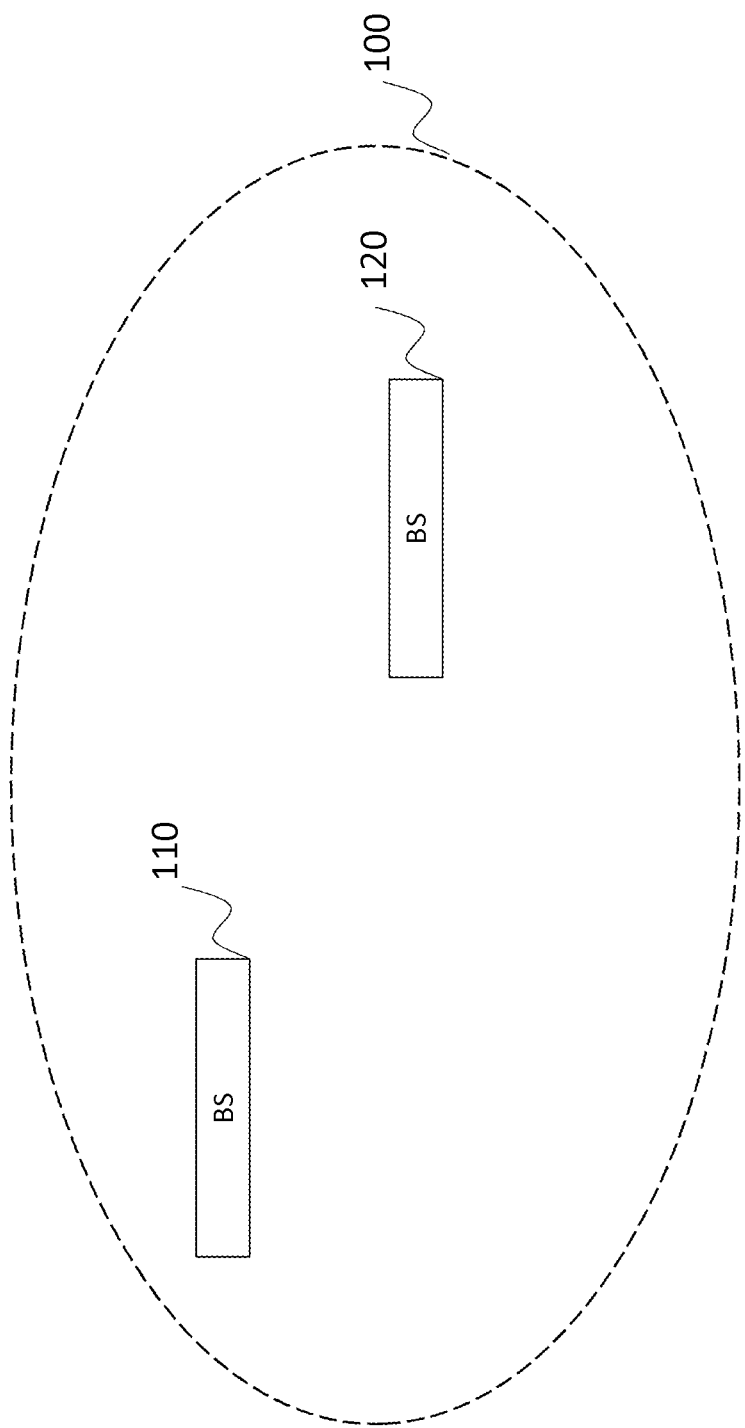
FIG. 3 is a diagram illustrating a cellular communication network including base stations, according to an exemplary embodiment of the invention.

As shown in FIG. 3, the invention can be implemented within entities, for example base stations ("BS") 110 and 120, of communication networks 100 by means of software and/or hardware components.

Figure 4:
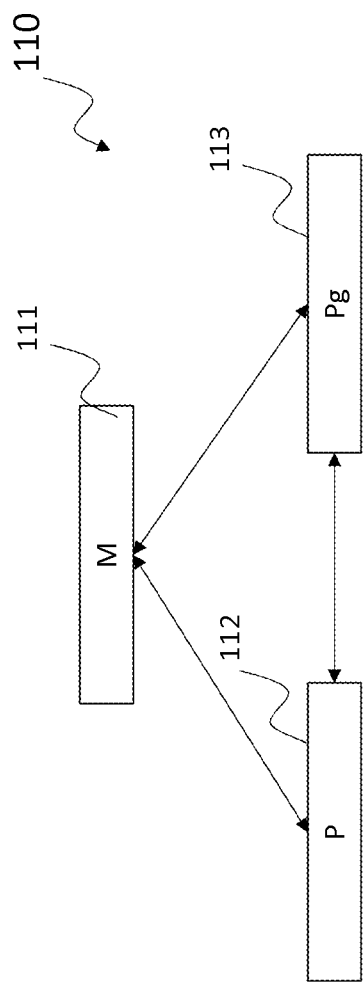
FIG. 4 is a diagram illustrating an exemplary embodiment of a base station according to an exemplary embodiment of the invention.

The software components may be integrated into a conventional computer program for network node management. It is for this reason, as indicated above, that the present invention also relates to a computing system 110, as shown in FIG. 4. This computing system 110 includes, as is conventional, a central processing unit 112 that uses signals to control a memory 111, and also an input unit and an output unit. Moreover, this computing system can be used to execute a computer program 113 that includes instructions for implementing any one of the channel estimation methods according to the invention.

Indeed, another subject of the invention is a computer program that is downloadable from a communication network and comprises instructions for carrying out the steps of a channel estimation method according to the invention when it is executed on a computer. This computer program may be stored on a computer-readable medium and may be executable by a microprocessor.

This program may use any programming language, and may be in the form of source code, object code, or intermediate code between source code and object code, such as in a partially compiled form, or in any other desirable form.

Another subject of the invention is an irremovable, or partially or fully removable computer-readable information medium that includes instructions of a computer program such as is mentioned above.

The information medium may be any entity or device capable of storing the program. For example, the medium may comprise a storage means, such as a ROM, for example a CD ROM or a microelectronic circuit ROM, or a magnetic recording means, such as a hard disk, or a USB flash drive (in English).

Moreover, the information medium may be a transmissible medium such as an electrical or optical signal, which may be routed via an electrical or optical cable, by radio or by other means. The computer program according to the invention may in particular be downloaded over an Internet network.

As a variant, the information medium may be an integrated circuit into which the program is incorporated, the circuit being designed to carry out or to be used in carrying out any one of the channel estimation methods according to the invention.

Although the present disclosure has been described with reference to one or more examples, workers skilled in the art will recognize that changes may be made in form and detail without departing from the scope of the disclosure and/or the appended claims.

The invention claimed is:

1. A channel estimation method in a communication network performed by a network entity, the method comprising:

for at least one time gap observed between two sub-sequences of channel measurements or of channel estimates consisting of complex vectors or scalars:

performing a first extrapolation on the basis of channel measurements or channel estimates of the sub-sequence that precedes said time gap, going forward in time, performing a second extrapolation on the basis of channel measurements or channel estimates of the sub-sequence that follows the time gap, going backward in time, and calculating a weighted mean of said channel measurements or said channel estimates extrapolated forward in time and of said channel measurements or said channel estimates extrapolated backward in time so as to obtain channel measurements or channel estimates that are regularly spaced out over the time gap; and using the channel measurements or the channel estimates during communication over the communication network.

2. The channel estimation method as claimed in claim 1, wherein said first extrapolation and said second extrapolation are performed, and said weighted mean is taken, by means of Kalman smoothing.

3. The channel estimation method as claimed in claim 1, wherein the method is implemented during a communication between the network entity and a mobile communicating object comprising at least one Predictor Antenna and at least one main antenna.

4. The method of claim 1 wherein the communication network is a cellular communication network and the network entity is accommodated in a base station of the cellular communication network.

5. A network entity for channel estimation, comprising:
a processor; and
a non-transitory computer-readable medium comprising program code instructions stored thereon which when executed by the processor configure the network entity to:
for a given time gap between two sub-sequences of channel measurements or of channel estimates consisting of complex vectors or scalars:
perform a first extrapolation on the basis of channel measurements or channel estimates of the sub-sequence that precedes said time gap, going forward in time,
perform a second extrapolation on the basis of channel measurements or channel estimates of the sub-sequence that follows the time gap, going backward in time, and
calculate a weighted mean of said channel measurements or said channel estimates extrapolated forward in time and of said channel measurements or said channel estimates extrapolated backward in time so as to obtain channel measurements or channel estimates that are regularly spaced out over the time gap; and use the channel measurements or the channel estimates during communication over a communication network.

6. The network entity as claimed in claim 5, wherein the instructions further configure the network entity to perform said first extrapolation and said second extrapolation, and take said weighted mean, by means of Kalman smoothing.

7. The network entity as claimed in claim 5, wherein the network entity is accommodated in a base station of a cellular communication network.

8. A communication network comprising at least one network entity, the at least one network entity comprising:
a processor; and
a non-transitory computer-readable medium comprising program code instructions stored thereon which when executed by the processor configure the at least one network entity to:
for a given time gap between two sub-sequences of channel measurements or of channel estimates consisting of complex vectors or scalars:
perform a first extrapolation on the basis of channel measurements or channel estimates of the sub-sequence that precedes said time gap, going forward in time,
perform a second extrapolation on the basis of channel measurements or channel estimates of the sub-sequence that follows the time gap, going backward in time, and
calculate a weighted mean of said channel measurements or said channel estimates extrapolated forward in time and of said channel measurements or said channel estimates extrapolated backward in time so as to obtain channel measurements or channel estimates that are regularly spaced out over the time gap; and
at least one mobile communicating object provided with at least one Predictor Antenna and at least one main antenna.

9. The communication network as claimed in claim 8, wherein the instructions further configure the at least one network entity to perform said first extrapolation and said second extrapolation, and take said weighted mean, by means of Kalman smoothing.

10. The communication network as claimed in claim 8, wherein the communication network is a cellular communication network and the at least one network entity is accommodated in a base station of the cellular communication network.

\* \* \* \* \*

UNITED STATES PATENT AND TRADEMARK OFFICE
CERTIFICATE OF CORRECTION

PATENT NO. : 11,159,349 B2  
APPLICATION NO. : 16/958300  
DATED : October 26, 2021  
INVENTOR(S) : Rikke Apelfrojd et al.

Page 1 of 1

It is certified that error appears in the above-identified patent and that said Letters Patent is hereby corrected as shown below:

On the Title Page

Item (12):
Delete "Apelfrodj" and insert --Apelfrojd--.

In the list of inventors in item (72):
For Rikke Apelfrodj, delete "Apelfrodj" and insert --Apelfrojd--.

Signed and Sealed this
Sixth Day of September, 2022

Katherine Kelly Vidal  
*Director of the United States Patent and Trademark Office*